US006721787B1

United States Patent
Hiscock (10) Patent No.: US 6,721,787 B1
(45) Date of Patent: Apr. 13, 2004

(54) SYSTEM AND METHOD FOR WIRELESS HOT-SYNCHRONIZATION OF A PERSONAL DIGITAL ASSISTANT

(75) Inventor: James Scott Hiscock, Rockport, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/501,204

(22) Filed: Feb. 10, 2000

(51) Int. Cl.[7] .............................. G06F 15/16; H04Q 7/20
(52) U.S. Cl. ........................ 709/217; 709/203; 709/216; 709/232; 709/248; 707/10; 707/203; 370/277; 370/310; 370/328
(58) Field of Search ................................ 370/277, 278, 370/310, 312, 313, 328, 338, 346, 349, 350, 352, 353, 432; 709/200, 201, 203, 213, 216, 217, 218, 219, 227, 230, 231, 232, 237, 248; 707/10, 203

(56) References Cited

U.S. PATENT DOCUMENTS 5,968,131 A * 10/1999 Mendez et al. ............. 709/246
6,304,881 B1 * 10/2001 Halim et al. ................ 707/201
6,324,542 B1 * 11/2001 Wright et al. ............ 707/104.1
6,397,259 B1 * 5/2002 Lincke et al. ............... 709/236
6,546,425 B1 * 4/2003 Hanson et al. .............. 709/227

* cited by examiner

Primary Examiner—Huy D. Vu
Assistant Examiner—Thomas E. Volper
(74) Attorney, Agent, or Firm—Weingarten, Schurgin, Gagnebin & Lebovici LLP (57) ABSTRACT

A wireless hot-sync system includes a personal digital assistant (PDA) having a transceiver for communicating over a wireless link, a hot-sync server having a transceiver for communicating with the PDA over the wireless link and a network interface for communicating with devices on a local area network (LAN), and a host system connected to the LAN. Upon receipt a hot-sync request from the PDA via the wireless link, the hot-sync server opens a network connection with the host system to establish a wireless hot-sync channel. The PDA and the host system exchange packets containing synchronization data, which is used by each device to update a local data set to bring it into correspondence with the data set of the other device. Upon completion of the wireless hot-sync, the hot-sync server closes the network connection and disables the hot-sync channel.

6 Claims, 5 Drawing Sheets

SYSTEM AND METHOD FOR WIRELESS HOT-SYNCHRONIZATION OF A PERSONAL DIGITAL ASSISTANT

CROSS REFERENCE TO RELATED APPLICATIONS

—Not Applicable—

STATEMENT REGARDING FEDERALLY SPONSORED RESEARCH OR DEVELOPMENT

—Not Applicable—

BACKGROUND OF THE INVENTION

The present invention is related to the field of digital data communications between devices for the purpose of maintaining data synchronization.

A Personal Digital Assistant (PDA) is a portable electronic device that accepts and stores information in one or more databases resident in onboard memory. These databases may include data used for an appointment calendar, for example, or an address/telephone book. The information may be for either personal or business use. A PDA user often maintains these databases on a host system, such as a personal computer, as well as on the PDA. By doing so, the user may achieve greater flexibility in the use and updating of database information.

It is generally desirable that the PDA database and the host system database contain the same information, in order to prevent the inadvertent use of "stale", or outdated, information. Thus, it is necessary to "synchronize" the databases periodically, i.e., to reflect changes that have been made in one database in the other. It is possible to maintain synchronization by manually copying changes from one database to the other. However, this process can be cumbersome, tedious and error-prone, and therefore in many cases is preferably avoided.

There are existing systems that are designed to accomplish synchronization between a PDA database and a host system database automatically, using synchronization software and/or hardware. For example, in one currently available system, a user synchronizes a PDA database with a host system database by installing the PDA into a special "cradle" connected to the host system and executing a "hot-sync" process. The PDA and host system exchange data that reflects the changes made to the respective databases since the last synchronization. Each system modifies its respective database accordingly, so that upon completion of the synchronization process the respective databases are identical.

Synchronization procedures such as described above may be inconvenient for a user, because of the requirement that the PDA be placed in a cradle that is physically connected to the host system. The user may find it difficult or impossible to return to the cradle to synchronize the databases. For example, the user may be a "mobile" user, such as a salesperson, who remains away from the host system for extended periods. In such a case, the user is required to either transfer changes manually, or to use the PDA and/or host system databases in an unsynchronized manner, running the risk of using stale information.

BRIEF SUMMARY OF THE INVENTION

In accordance with the present invention, a method and system for wireless hot-synchronization of a Personal Digital Assistant (PDA) device with a host system is disclosed. The system avoids the use of a cradle tethered to the host system, along with the attendant inconvenience.

The disclosed system includes a hot-sync server that establishes a wireless hot-sync channel between a PDA and a host system, such as a personal computer. The PDA includes a wireless transceiver, such as a radio-frequency (RF) transceiver, for communication over a wireless link with the hot-sync server also having a wireless transceiver. The host system and hot-sync server are communicatively coupled to each other, for example via a local area network (LAN). Upon receiving a hot-sync request over the wireless link from the PDA, the hot-sync server establishes a network connection with the host system. The PDA and host system then exchange data packets over the hot-sync channel that includes the wireless channel between the PDA and the hot-sync server and the network connection between the hot-sync server and the host system. Preferably, the data exchange is performed using a standard communication protocol.

In general, the hot-sync system can support synchronization among a number of PDAs and respective host systems. The system may rely on a single hot-sync server or on multiple servers, to provide increased capacity and/or to enhance system availability. The hot-sync system can enhance the usability of PDAs and similar untethered devices, providing database users with accurate data while reducing physical constraints imposed on the synchronization process.

Other aspects, features, and advantages of the present invention are disclosed in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
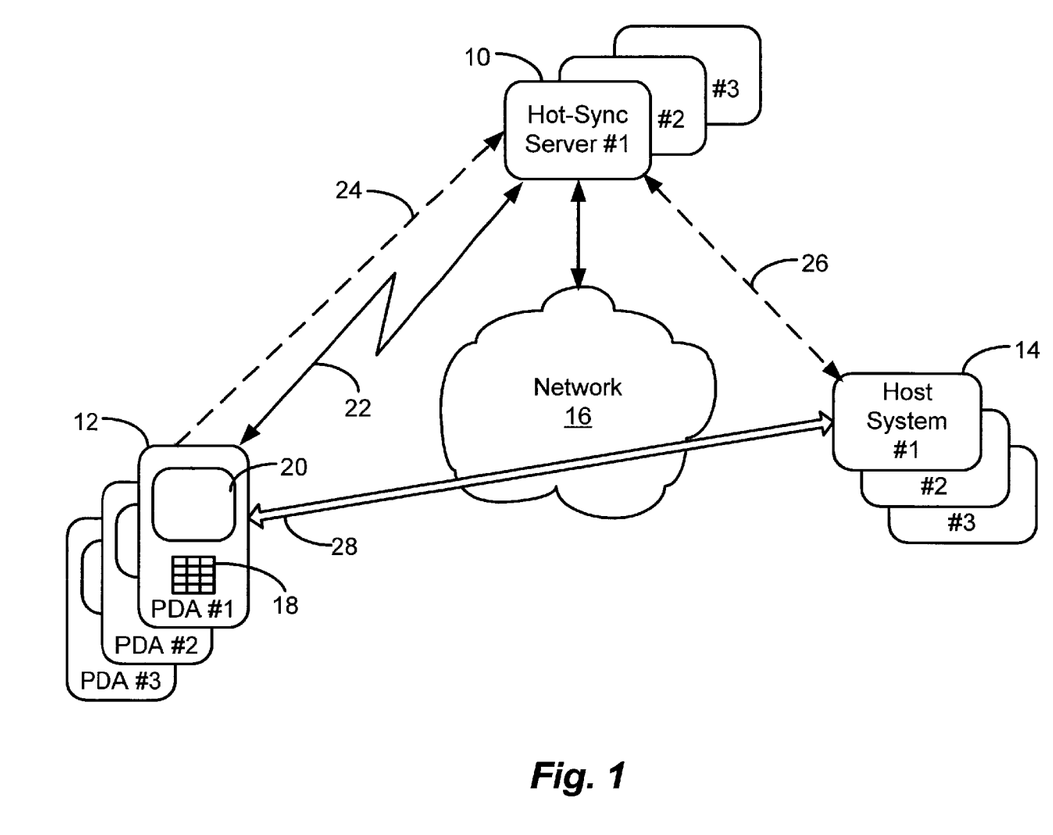
FIG. 1 is a block diagram of a wireless hot-sync system.

A wireless Personal Digital Assistant (PDA) hot-sync system is illustrated in FIG. 1. The system comprises one or more hot-sync servers 10, one or more PDA devices 12, and a plurality of host systems 14. The servers 10 and host systems 14 are communicatively coupled to a local area network (LAN) 16. The PDA 12 includes function keys 18 and a touch screen 20 for viewing, manipulating, and modifying database information stored in the PDA 12. The PDA 12 and hot-sync server 10 communicate over a wireless link 22 using a standard communication protocol, such as the IEEE standard 802.11 protocol or an emerging wireless communication protocol referred to by the name "Bluetooth". The circuitry implementing the communication protocol may be integral to the PDA 12, or it may be implemented in an external device or a plug-in module, for example. The hot-sync server 10 may be directly connected to the LAN 16, or it may connect to the LAN 16 through other devices such as network routers (not shown). The host system 14 may be a personal computer, or a network server that maintains a database for use by multiple network users, for example.

As shown in FIG. 1, a hot-sync operation employs three channels as follows: a channel 24 between the PDA 12 and the hot-sync server 10 carried on the wireless link 22, a channel 26 between the hot-sync server 10 and the host system 14 over the LAN 16, and a channel 28 between the host system 14 and the PDA 12, which is carried over the LAN 16 and the wireless link 22. The manner in which these channels are established and used is described below.

Figure 2:
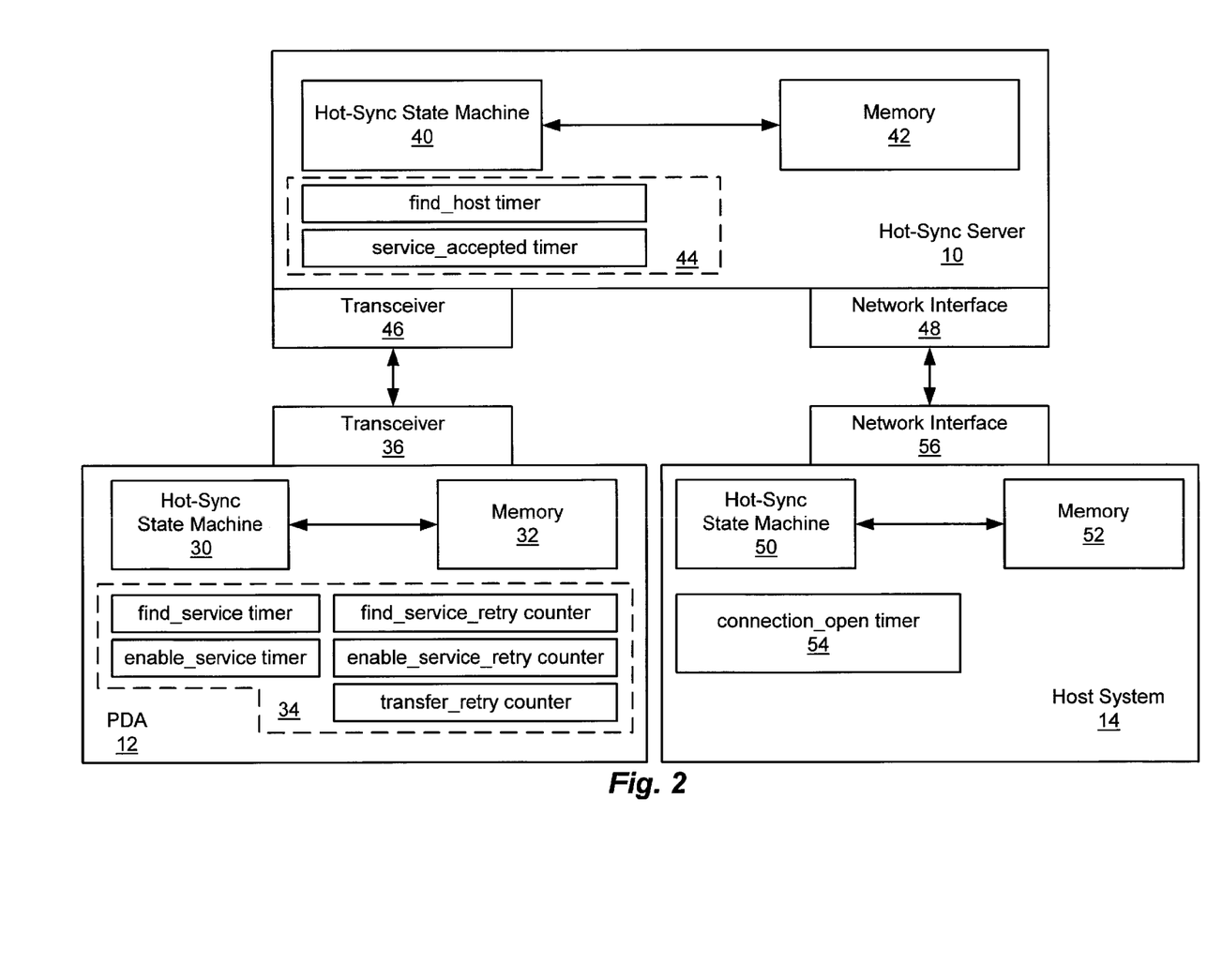
FIG. 2 is a more detailed block diagram of the wireless hot-sync system of FIG. 1.

FIG. 2 shows elements of a PDA 12, a hot-sync server 10, and a host system 14 in more detail. A PDA hot-sync state machine 30 is implemented in software or firmware stored in PDA memory 32 and executed by an on-board processor (not shown). The PDA hot-sync state machine 30 maintains several timers 34, described below, that are used in the synchronization process. The PDA 12 also includes a wireless transceiver 36 for communicating the hot-sync server 10. Transceiver communication may be accomplished using radio-frequency, microwave, infrared or other wireless transmission schemes capable of supporting the specified communication protocol.

A server hot-sync state machine 40 is implemented in software stored in server memory 42 and executed by a processor (not shown). The server hot-sync state machine 40 maintains timers 44 that are used in the synchronization process. The hot-sync server 10 includes a wireless transceiver 46 for communicating with the PDA 12, and also includes a network interface 48 for communicating directly or indirectly with the host system 14. The network interface 48 may use any of a variety of conventional network protocols, such as the Ethernet protocol.

In the host system 14, a host system hot-sync state machine 50 is likewise implemented in software, which is stored in host system memory 52 and executed by a processor (not shown). The host system hot-sync state machine 50 maintains a single timer 54 used during the synchronization process. The host system 14 includes a network interface 56 for communicating with the hot-sync server 10 and the PDA 12 via the LAN 16.

Figure 3:
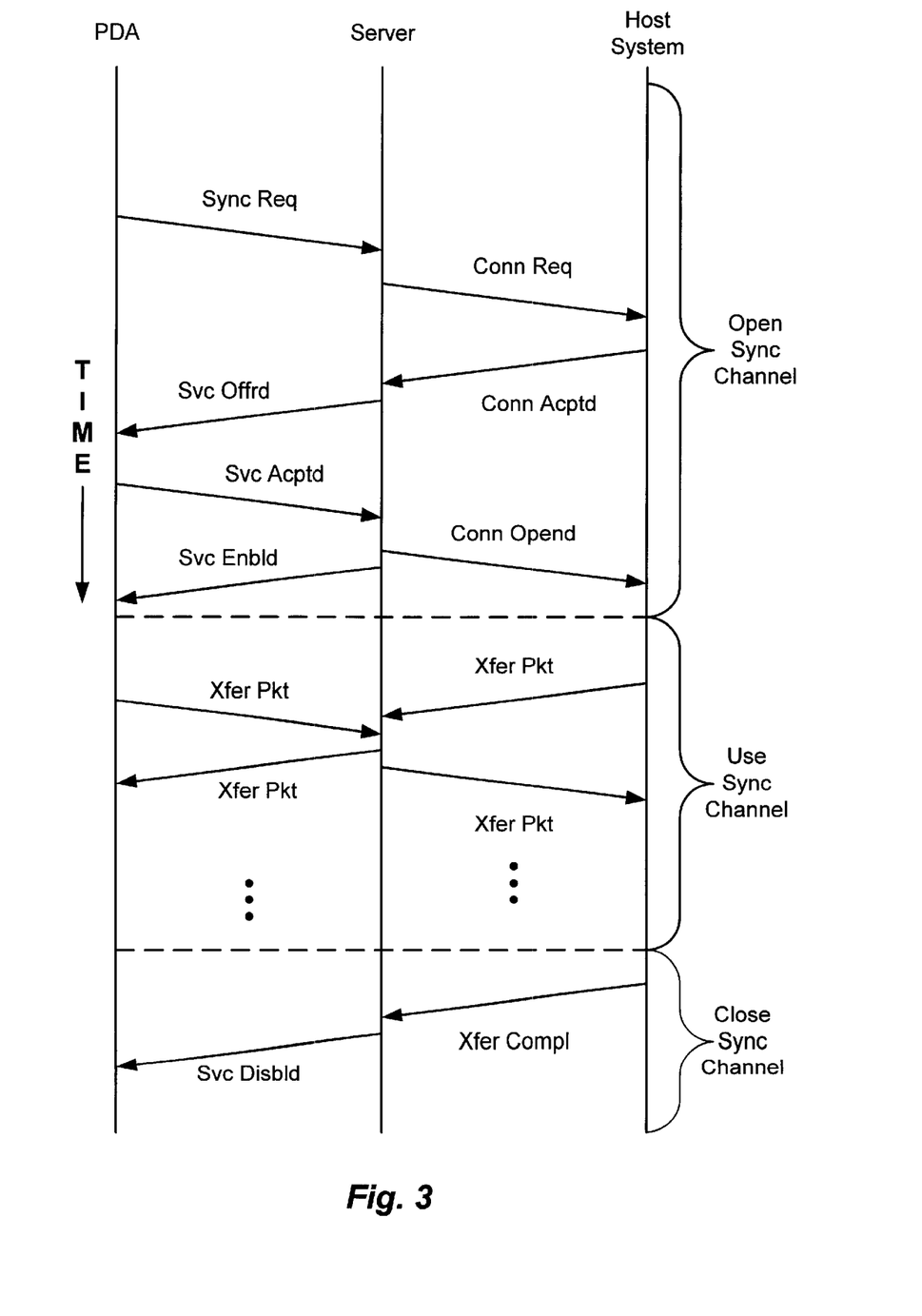
FIG. 3 is a timing diagram of messages exchanged during a hot-sync operation executed by the wireless hot-sync system of FIGS. 1 and 2.

FIG. 3 shows a sequence of messages used to carry out a hot-sync operation in the PDA hot-sync system. As shown, there are three distinct phases of operation: an Open Channel phase during which a hot sync channel between the PDA 12 and the host system 14 is created; a Use Channel phase during which data packets are exchanged between the PDA 12 and the host system 14 to synchronize the respective databases; and a Close Channel phase during which the hot-sync channel is de-established.

The process begins when the PDA 12 transmits a synchronization request (SYNC REQ) message. The SYNC REQ message indicates that the PDA 12 desires to perform a hot-sync operation with one of the host systems 14. The target host system 14 is identified in the SYNC REQ message, preferably by a name that is mapped to a network address by a distributed name service. It may be possible in alternative embodiments to identify the target host system 14 in other ways, for example by using a directory that maps the identity of the requesting PDA 12 to the identity of the target host system 14.

The hot-sync request message includes a "well-known" multicast address to which the servers 10 listen. Each hot-sync server that receives the SYNC REQ message sends a connection request (CONN REQ) message to the designated host system 14, requesting that the host open a connection to be used for a hot-sync operation. The host first determines if it is able to participate in the requested hot-sync operation. The host's ability to participate may be affected by, for example, the availability of network connections or other host resources, and may also depend on the satisfaction of some security criteria, such as verifying the identity of the requesting PDA 12. If the host system 14 decides not to grant the hot-sync request, it takes no further action, and the requesting PDA 12 ultimately times out (see below). Otherwise, the host system 14 returns a connection accepted (CONN ACPTD) message to the hot-sync server 10. The hot-sync server 10 then sends a service offered (SVC OFFRD) message to the PDA 12, indicating that the requested hot-sync operation can be performed via the responding hot-sync server 10.

Due to the multicast nature of the hot-sync request, the PDA 12 may receive replies from more than one hot-sync server 10. The PDA 12 must choose one hot-sync server 10 through which it will establish the hot-sync channel to the desired host system 14. The PDA 12 may employ one of many different algorithms, such as first reply received, to determine which server will be used to establish the wireless hot-sync channel.

The PDA 12 then sends a service accepted (SVC ACPTD) message to the hot-sync server 10, indicating that the PDA 12 accepts the offer of service. Upon receiving the SVC ACPTD message, the hot-sync server 10 sends a connection opened (CONN OPEND) message to the host system 14 to open the channel 28 (FIG. 1) that will be used for data transfer between the host system 14 and the PDA 12 during the hot-sync operation. After the channel 28 is opened, the hot-sync server 10 sends a service enabled (SVC ENBLD) message to the PDA 12. This message prompts the PDA 12 to commence the actual transfer of hot-sync data over the hot-sync channel 28.

During the Use Channel phase, the hot-sync server 10 relays transfer packet (XFER PKT) messages between the PDA 12 and the host system 14. Any errors that occur during the transfer of packets are handled within the communication protocol established between the PDA 12 and the host system 14. If the transfer terminates normally, the host system 14 sends a transfer complete (XFER COMPL) message, to which the hot-sync server 10 responds by sending a service disabled (SVC DISBLD) message to the PDA 12. This marks the completion of the hot-sync operation. The transfer may also complete abnormally, for example due to a failure of the transfer protocol. If such a failure is detected by the hot-sync server 10, it sends a SVC DISBLD message to the PDA 12 informing the PDA 12 that the operation has terminated.

It should be noted that the mechanism described herein for opening, maintaining, and closing the wireless communication channel is independent from the data transfer protocol that is used by the PDA 12 and the host system 14 to transfer data. In particular, it is assumed that the transfer protocol has its own error detection and handling features, and that each device has a suitable interface to the operating system and/or user. Thus in the above case in which the PDA 12 receives a SVC DISBLD message for an error case, it is assumed that higher-level software detects the premature closing of the channel, and takes appropriate action. While it may be possible in alternative embodiments to incorporate additional error detection and handling features in the channel-establishing mechanism, the disclosed technique offers the benefits of a very simple interface to higher-level software.

Figure 4:
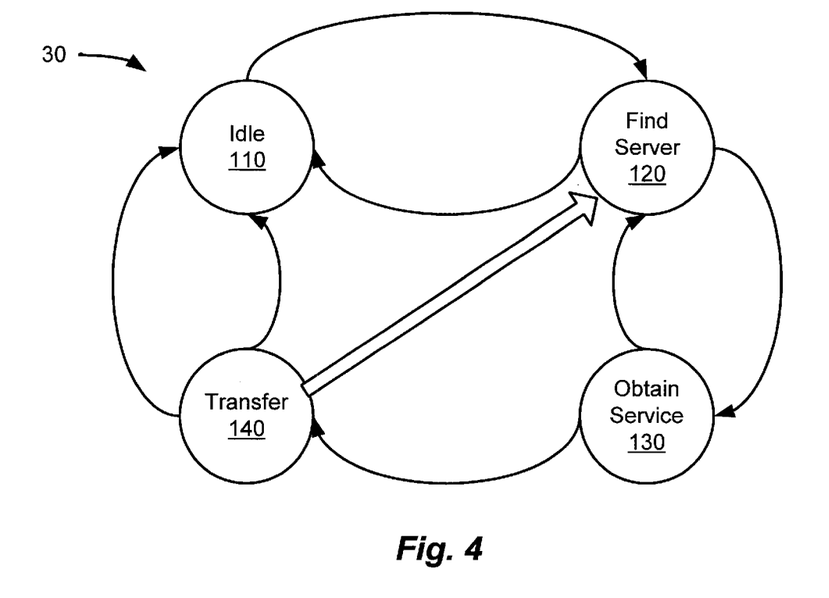
FIG. 4 is a state diagram depicting the operation of a hot-sync state machine in a Personal Digital Assistant (PDA) in the wireless hot-sync system of FIGS. 1 and 2.

FIG. 4 shows the operation of the PDA hot-sync state machine 30. The PDA hot-sync state machine 30 remains in an IDLE state 110 until a user requests a wireless hot-sync operation. The request may be indicated, for example, using a function key 18 (FIG. 1), or using an icon or menu item on the touch screen 20 (FIG. 1). In response, the PDA 12 transmits a multi-cast SYNC REQ message for receipt by one or more hot-sync servers 10 as described above. Several counters, referred to as a find_service_retry counter, an enable_service_retry counter and a transfer_retry counter (see FIG. 2), are reset. A timer referred to as the find_service timer is enabled, and the PDA hot-sync state machine 30 transitions to a FIND SERVER state 120.

In the FIND SERVER state 120, the PDA 12 waits for a SVC OFFRD message from a hot-sync server 10 over the wireless link 22. If a SVC OFFRD message is not received before the expiration of the find_service timer, then the value of the find_service_retry counter is compared with a predetermined value referred to as the max_service_retries value. If the value of the find_service_retry counter is less than the max_service_retries value, the PDA 12 increments the find_service_retry counter, transmits another SYNC REQ message, resets the find_service_timer, and remains in the FIND SERVER state 120 to again await the return of a SVC OFFRD message. If, however, the value of the find_service_retry counter is equal to the max_service_retries value, indicating that the attempts to find a hot-sync server 10 have failed, the PDA hot-sync state machine 30 transitions back to the IDLE state 110.

If the PDA hot-sync state machine 30 receives a SVC OFFRD message when in the FIND SERVER state 120, it cancels the find_service timer, transmits a SVC ACPTD message over the wireless link 22 to the hot-sync server 10 that sent the SVC OFFRD message, sets an enable_service timer, and transitions to an OBTAIN SERVICE state 130. The value of the find_service_retry counter is maintained. As described below, the FIND SERVER state 120 may be entered again at a later point in the process. Maintaining the value of the find_service_retry counter ensures that an infinite loop will not result from such re-entry.

In the OBTAIN SERVICE state 130, the PDA hot-sync state machine 30 waits to receive a SVC ENBLD message. If the enable_service timer expires before a SVC ENBLD message is received, then the value of a counter referred to as an enable_service_retry counter is compared with a predetermined value referred to as a max_enable_service_retries value. If the value of the enable_service_retry counter is less than the value of max_enable_service_retries, the PDA hot-sync state machine 30 increments the enable_service_retry counter, transmits another SVC ACPTD message to the same hot-sync server 10, and re-starts the enable_service timer. On the other hand, if the value of the enable_service_retry counter is equal to the max_enable_service_retries value when the enable_service timer expires, indicating that the hot-sync server 10 has become unavailable, the PDA hot-sync state machine 30 transitions back to the FIND SERVER state 120 to attempt to find another hot-sync server 10. As mentioned above, the value of the find_service_retry counter has been maintained, so that this re-entry does not result in an infinite loop through the FIND SERVER and OBTAIN SERVICE states 120 and 130.

When the PDA hot-sync state machine 30 is in the OBTAIN SERVICE state 130 and receives a SVC ENBLD message from the hot-sync server 10, it cancels the enable_service timer and transitions to a TRANSFER state 140. At this point, the hot-sync communications channel 28 has been established, and either the PDA 12 or the host system 14 can initiate the transfer of data, which may be carried out in the same manner as in the above-described configuration in which a conventional PDA is placed in a hot-sync cradle. When in the TRANSFER state 140, the PDA hot-sync state machine 30 transmits XFER PKT messages to the hot-sync server 10 and receives XFER PKT messages from the hot-sync server 10 using an appropriate communication protocol. A known protocol such as File Transfer Protocol (FTP) or Trivial File Transfer Protocol (TFTP) may be employed. The protocol to be used may be specified as a PDA configuration parameter, or it may be specified using a discovery mechanism over the communication channel 28 once established.

If the hot-sync transfer completes successfully, the PDA hot-sync state machine 30 receives a SVC DISBLD message from the hot-sync server 10, cancels all timers, and transitions back to the IDLE state 110.

When the PDA hot-sync state machine 30 is in the TRANSFER state 140, the PDA 12 may detect a non-recoverable transfer protocol failure, such as by timeout or an explicit notification. The hot-sync server 10 may also detect a failure of the hot-sync channel 28, in which case it will send a SVC DISBLD message to the PDA 12. In either case, if the value of the transfer_retry counter is less than a value referred to as the max_transfer_retries value, the PDA 12 increments the transfer_retry counter, transmits a new SYNC REQ message addressed to any nearby hot-sync server 10 over a corresponding wireless link 22, re-enables the find_service timer, and transitions back to the FIND SERVER state 120 in an attempt to re-establish a channel 28. Again, the saving of the find_service_retry counter prevents the occurrence of infinite loops through the FIND SERVER, OBTAIN SERVICE and TRANSFER states. On the other hand, if the content of the transfer_retry counter is equal to the max_transfer_retries value, indicating that attempts to complete the transfer have failed, the PDA hot-sync state machine 30 transitions back to the IDLE state 110.

Figure 5:
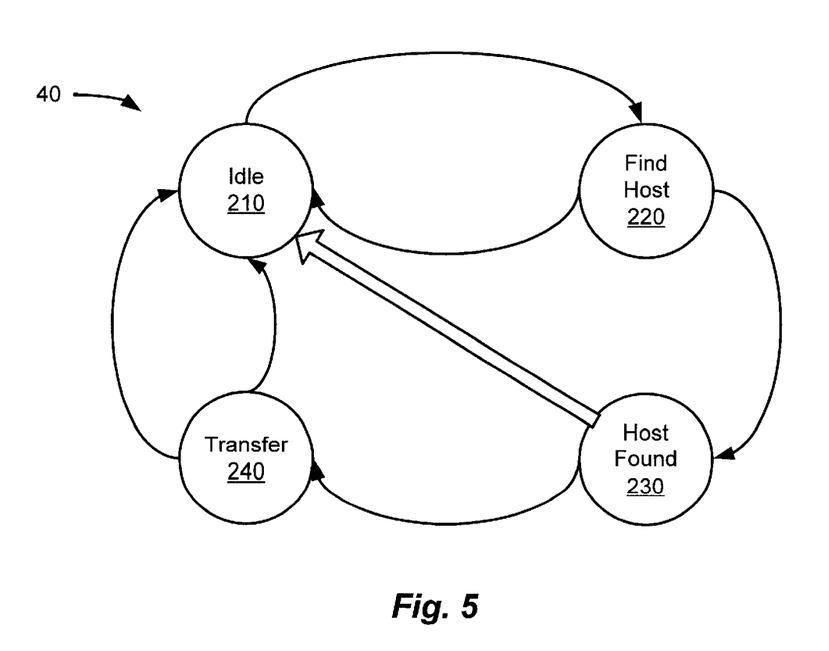
FIG. 5 is a state diagram depicting the operation of a hot-sync state machine in a hot-sync server in the wireless hot-sync system of FIGS. 1 and 2.

FIG. 5 shows the operation of the server hot-sync state machine 40. The server hot-sync state machine 40 remains in an IDLE state 210 until it receives a SYNC REQ message from a PDA 10 over a corresponding wireless link 22. The hot sync server 10 may have a plurality of hot-sync state machines 40 operating concurrently to service requests from a number of different PDAs 12 in its local area. If the hot-sync server 10 is available to service the hot-sync request, it sends a CONN REQ message to the host system 14 designated in the SYNC REQ message, enables a timer referred to as a find_host timer, and transitions 201 to a FIND HOST state 220. If the hot-sync server 10 is not available to service the hot-sync request, the server hot-sync state machine 40 takes no action and remains in the IDLE state 210.

When in the FIND HOST state 220, the server hot-sync state machine 40 awaits the receipt of a CONN ACPTD message from the designated host system 14. If the find_ host timer expires before a CONN ACPTD message is received, the server hot-sync state machine 40 immediately transitions back to the IDLE state 210. If a CONN ACPTD message is received before the expiration of the find_host timer, the server hot-sync state machine 40 cancels the find_host timer, transmits a SCV OFFRD message to the PDA 12, enables a timer referred to as a service_accepted timer, and transitions to a HOST FOUND state 230.

When the server hot-sync state machine 40 is in the HOST FOUND state 230, it awaits the receipt of a SVC ACPTD message from the PDA 12. If the service_accepted timer expires before a SVC ACPTD message is received, the server hot-sync state machine 40 transitions back to the IDLE state 210. If a SVC ACPTD message is received before expiration of the service_accepted timer, the server hot-sync state machine 40 cancels the service_accepted timer, transmits a CONN OPEND message to the host system 14, and transmits a SVC ENBLD message to the PDA 12. The server hot-sync state machine 40 then transitions to the TRANSFER state 240.

When the server hot-sync state machine 40 is in the TRANSFER state 240, the hot-sync server 10 receives XFER PKT messages from the host system 14 and forwards these messages as XFER PKT messages to the PDA 12, and also receives XFER PKT messages from the PDA 12 and forwards these messages as XFER PKT messages to the host system 14. The hot-sync server 10 preferably implements an activity timer (not shown) to determine whether a disconnect occurs on either side (wireless or network) of the hot-sync channel 28. The activity timer may be watching for any channel traffic or for required two-way traffic. If failure of the hot-sync channel 28 is detected when the server hot-sync state machine 40 is in the TRANSFER state 240, the hot-sync server 10 transmits a SVC DISBLD message to the PDA 12 and closes the hot-sync channel 28, and the server hot-sync state machine 40 transitions to the IDLE state 210. If the transfer protocol completes successfully, as indicated by the receipt of a XFER COMPL message from the host system 14, the hot-sync server 10 transmits a SVC DISBLD message to the PDA 12, and the server hot-sync state machine 40 transitions to the IDLE state 210.

Figure 6:
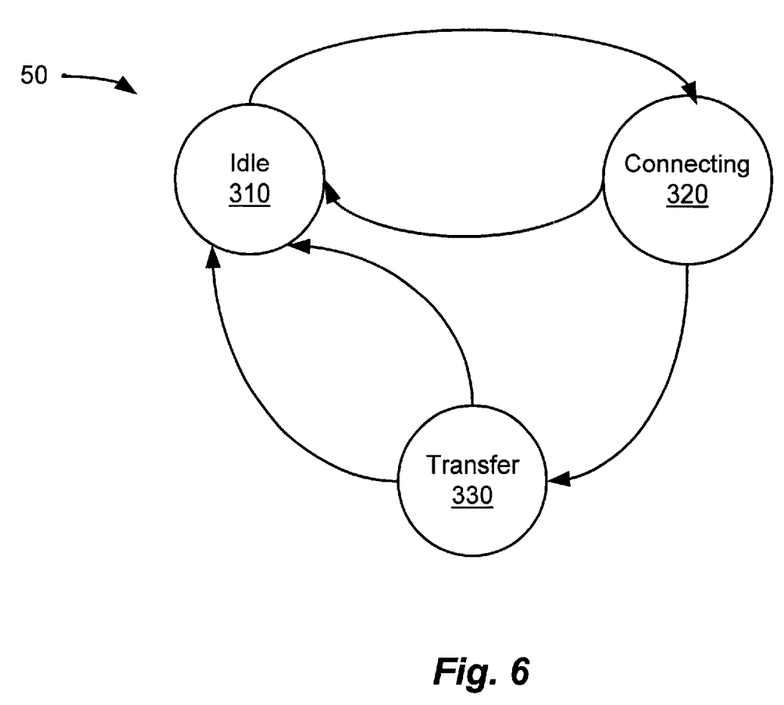
FIG. 6 is a state diagram depicting the operation of a hot-sync state machine in a host system in the wireless hot-sync system of FIGS. 1 and 2.

FIG. 6 shows the operation of the host system hot-sync state machine 50. The host system hot-sync state machine 50 remains in an IDLE state 310 until the host system 14 receives a CONN REQ message from a hot-sync server 10. The host system 14 may have a plurality of hot-sync state machines 50, one per PDA 12, operating concurrently. If the host system 14 is available to service the hot-sync request, the host system 14 sends a CONN ACPTD message to the hot-sync server 10, enables a connection_open timer, and transitions to a CONNECTING state 320. If the host system 14 is not available to service the hot-sync request, the host system hot-sync state machine 50 takes no action and remains in the IDLE state 310.

When in the CONNECTING state 320, the host system hot-sync state machine 50 waits for a CONN OPEND message indicating that the connection to the requesting PDA 12 should be opened. If the connection_open timer expires before a CONN OPEND message is received from the hot-sync server 10, the host system hot-sync state machine 50 immediately transitions back to the IDLE state 310. If a CONN OPEND message is received before expiration of the connection_open timer, the host system 14 cancels the connection_open timer and transitions to a TRANSFER state 330.

When in the TRANSFER state 330, the host system 14 transmits XFER PKT messages to the hot-sync server 10 and receives XFER PKT messages from the hot-sync server 10. During this period, if the host system 14 detects a non-recoverable transfer protocol failure or receives a SVC DISBLD message (not shown in FIG. 3) from the hot-sync server 10, the host system hot-sync state machine 50 transitions to the IDLE state 310. If the transfer protocol completes successfully, the host system 14 transmits a XFER COMPL message to the hot-sync server 10, and the host system hot-sync state machine 50 transitions to the IDLE state 310.

Techniques for the wireless hot-synchronization of a PDA have been shown. Those skilled in the art will recognize that variations and modifications of the disclosed techniques are possible. For example, a hot-sync server may establish different hot-sync channels with host systems that are on different networks. Other variations are also possible. Accordingly, it is submitted that the invention should not be limited to the described embodiment but rather should be limited only by the scope and spirit of the appended claims.

What is claimed is:

1. A wireless hot-sync system, comprising:

a first data processing device having first storage system containing a first data set, the first data processing device being operative to transmit a hot-sync request message over a wireless communications link;

a second data processing device having a second storage system containing a second data set; and a server operative to receive the hot-sync request message and in response to the receipt of the hot-sync request message to establish a communication channel between the first data processing device and the second data processing device, wherein the communication channel includes the wireless communications link between the first data processing device and the server;

the server being operative, upon receipt of the hot-sync request from the first data processing device, to transmit a connection request message to the second data processing device, and upon receipt of a connection accepted message from the second data processing device, to transmit a service offered message to the first data processing device, the service offered message indicating the ability of the server to establish the communication channel, and upon receipt of a service accepted message from the first data processing device, to transmit a connection opened message to the second data processing device and a service enabled message to the first data processing device, the connection opened and service enabled messages each indicating that the communication channel can be utilized for the transfer of information by the respective data processing device;

the first data processing device being operative, upon receipt of the service offered message from the server, to determine whether to accept the offer of service, and upon determining to accept the offer of service, to transmit the service accepted message to the server, and upon receipt of the service enabled message from the server, to engage in the transfer of information with the second data processing device;

the second data processing device being operative, upon receipt of the connection request message from the server, to determine whether to accept the connection request, and upon accepting the connection request to establish the requested connection and return the connection accepted message to the server, and upon receipt of the connection opened message from the server, to engage in the transfer of information with the first data processing device; and at least one of the first and second data processing devices being operative to selectively transfer information to the other of the first and second data processing devices over the communication channel, and at least the other of the first and second data processing devices being operative to modify its data set based on the transferred information to bring the first and second data sets into correspondence.

2. A wireless hot-sync system according to claim 1, wherein the first data processing device is a personal digital assistant.

3. A wireless hot-sync system according to claim 1, wherein the second data processing device is a personal computer.

4. A wireless hot-sync system according to claim 1, wherein the first data processing device is a personal digital assistant, and the second data processing device is a personal computer.

5. A wireless hot-sync system according to claim 1, wherein:

the second data processing device is operative, upon completion of the transfer of information, to transmit a transfer complete message to the server; and the server is operative, upon receipt of the transfer complete message from the second data processing device, to transmit a service disabled message to the first data processing device, the service disabled message indicating that the communication channel has been closed.

6. A method of bringing first and second data sets stored in respective first and second data processing devices into correspondence, comprising:

transmitting a hot-sync request message from the first data processing device to a server over a wireless communications link;

in response to the receipt of the hot-sync request message at the server, establishing a communication channel between the first data processing device and the second data processing device, the communication channel including the wireless communications link between the first data processing device and the server, the channel-establishing including:

at the server, upon receipt of the hot-sync request from the first data processing device, transmitting a connection request message to the second data processing device, and upon receipt of a connection accepted message from the second data processing device, transmitting a service offered message to the first data processing device, the service offered message indicating the ability of the server to establish the communication channel, and upon receipt of a service accepted message from the first data processing device, transmitting a connection opened message to the second data processing device and a service enabled message to the first data processing device, the connection opened and service enabled messages each indicating that the communication channel can be utilized for the transfer of information by the respective data processing device;

at the first data processing device, upon receipt of the service offered message from the server, determining whether to accept the offer of service, and upon determining to accept the offer of service, transmitting the service accepted message to the server, and upon receipt of the service enabled message from the server, engaging in the transfer of information with the second data processing device; and at the second data processing device, upon receipt of the connection request message from the server, determining whether to accept the connection request, and upon accepting the connection request establishing the requested connection and returning the connection accepted message to the server, and upon receipt of the connection opened message from the server, engaging in the transfer of information with the first data processing device; and selectively transferring information from at least one of the first and second data processing devices to the other of the first and second data processing devices over the communication channel, and modifying the data set in at least the other of the first and second data processing devices based on the transferred information to bring the first and second data sets into correspondence.

\* \* \* \* \*